(12) United States Patent
Starkey et al.

(10) Patent No.: US 8,038,425 B2
(45) Date of Patent: Oct. 18, 2011

(54) INJECTION MOLD FRICTION PULLER

(75) Inventors: Glenn Starkey, Wauconda, IL (US); Anthony J. Cerniglia, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 244 days.

(21) Appl. No.: 12/107,060

(22) Filed: Apr. 21, 2008

(65) Prior Publication Data

US 2009/0263528 A1  Oct. 22, 2009

(51) Int. Cl.
B29C 45/17 (2006.01)

(52) U.S. Cl. ........ 425/171; 425/190; 425/443; 425/472; 425/546; 425/589; 425/812

(58) Field of Classification Search .................. 425/190, 425/192 R, 546, 589, 450.1, 454, 472, 171, 425/173, 812, 169, 441, 443, 556
See application file for complete search history.

(56) References Cited

U.S. PATENT DOCUMENTS 3,986,805 A * 10/1976 Haines ........................ 425/450.1
6,431,852 B1 * 8/2002 Vandenberg .................. 425/589
6,537,053 B1 * 3/2003 Watkins ........................ 425/190

FOREIGN PATENT DOCUMENTS

| DE | 28 15 698 A1 | 4/1978 |
| DE | 102 44 686 A1 | 9/2002 |
| DE | 203 02 936 U1 | 5/2003 |
| JP | 11 000921 A | 1/1999 |
| JP | 2004 106235 A | 4/2004 |

OTHER PUBLICATIONS

Progressive Components, "Friction Pullers," Progressive Components Catalog (on-line), www.procomps.com/_pdf/IMT_catpages8/D-25.pdf, Oct. 2008 (1 page).
Co-pending U.S. Appl. No. 12/384,997, "Injection Mold Friction Puller," filed Apr. 10, 2009.

* cited by examiner

Primary Examiner — James Mackey
(74) Attorney, Agent, or Firm — Pauley Petersen & Erickson (57) ABSTRACT

A friction puller for an injection mold is disclosed. The friction puller has a bolt with a head portion and a threaded portion. The friction puller has first and second first substantially hemispherical wedges having a first and second passages running through them for the bolt and allow lateral float about the bolt. The friction puller also has a deformable jacket having a third passage running through is for the bolt and first and second substantially hemispherical cups for receiving the first and second substantially hemispherical wedges. The first hemispherical wedge can have a vent relief notch disposed in a top surface of the first hemispherical wedge. The deformable jacket can have a jacket vent notch disposed in a top surface of the deformable jacket. The bolt head and the jacket can have alignment indicator marks thereon. The bolt threads can have a variable pitch diameter.

22 Claims, 7 Drawing Sheets

INJECTION MOLD FRICTION PULLER

BACKGROUND OF THE INVENTION

The present invention relates to injection molding devices, and more specifically to a friction puller of a multiple plate injection mold.

DESCRIPTION OF THE RELATED ART

Friction pullers are used in injection mold application to help control the sequential movements of various plates during mold operations. One such friction puller is shown in German Patent No. DE 2815698, which is assigned to the HASCO Company. Friction pullers made according HASCO have a bolt which has a substantially conical shaped shank. The bolt is inserted into a resin jacket that has a corresponding substantially conical shaped passage for receiving the bolt shank. When the bolt is tightened, the bolt head compresses the jacket lengthwise and the shank presses laterally on the jacket. The result is that under the load from the tightened bolt, the jacket has an increased diameter compared to when it is in an unloaded condition.

Another type of friction puller is also produced by HASCO. In these friction pullers, a bolt with a straight set of threads is used. The bolt is secured into a key member that passes through one of the mold plates. The key has at least one flat surface to prevent the key from rotating inside the mold plate. The end of the key that receives that bolt has a hemispherical wedge section integral to or fixed to the key member. A resin jacket is again used. The jacket has a hemispherical cup inside one end of the jacket to correspond to the hemispherical wedge on the key member. The other end of the jacket has a second hemispherical cup for receiving a hemispherical washer used between the bolt head and the jacket. Again, when the bolt is tightened, the hemispherical washer and hemispherical wedge compress the jacket lengthwise forcing the jacket to increase slightly in diameter.

A problem encountered with both of these types of friction pullers is that they do not accommodate typical manufacturing conditions with respect to installation or operational environments, which results in inconsistent performance. For example, these products are fix mounted into the mold plates. Thermal expansion, build tolerances and the like can lead to the pullers not being centered with respect to the respective pockets in the opposing mold plates. While small, these misalignments can cause the mold to lock because of different force levels exerted by each of the friction pullers in the mold (typically, multiple friction pullers are used in a single mold).

Another problem encountered with both of the types of friction pullers described above is the creation of air pressure differentials during use. As the pullers are design to friction fit into the pockets the receive them, often the puller creates an air tight seal against the pocket. During mold close, the mold has to compress the air in the pocket to close the mold. This compressed air wants to push the puller out of the pocket. Alternatively, if the air escapes the pocket during mold closure, but the jacket creates an air tight seal once the mold is fully closed, a vacuum is created in the pocket when the puller attempts to pull out from the pocket. Neither of the friction pullers described above provide for air to flow in and out of the pocket during mold open an mold closure operations. Accordingly, either the compressed air or vacuum conditions can occur randomly, creating an undesirable variation in the force exerted by the friction pullers.

Thus, there remains a need for an improved friction puller. There remains a need for a self-aligning friction puller. There remains a need for a friction puller to controllably allow air to pass into and out of the pocket that receives the friction puller.

SUMMARY

In view of the deficiencies described above, it is an object of the present invention to provide an improved friction puller.

It is a further object of the present invention to provide a friction puller that is self-aligning.

It is a further object of the present invention to provide a friction puller that controllably allows air to pass into and out of the pocket that receives the friction puller.

The present invention is a friction puller for an injection mold. The friction puller has a bolt, the bolt has a head portion and a threaded portion. The friction puller also has a first substantially hemispherical wedge. The first substantially hemispherical wedge has a first passage running through it for the bolt. The first passage allows the first substantially hemispherical wedge a first predetermined amount of lateral float relative to the bolt. The friction puller also has a second substantially hemispherical wedge. The second substantially hemispherical wedge has a second passage running through it for the bolt. The second passage allows the second substantially hemispherical wedge a second predetermined amount of lateral float relative to the bolt.

The friction puller also has a deformable jacket. The jacket has a third passage running through it for the bolt. The jacket has a first substantially hemispherical cup for receiving the first substantially hemispherical wedge and a second substantially hemispherical cup for receiving the second substantially hemispherical wedge.

Preferably, the first hemispherical wedge has a least one vent relief notch disposed in a top surface of the first hemispherical wedge. The vent relief notch allows air to pass through during mold operation. Likewise the deformable jacket preferably has at least one jacket vent notch disposed in a top surface of the deformable jacket. The jacket vent notch also allows air to pass through during mold operation.

Preferably, the head portion of the bolt has at least one bolt alignment indicator mark in it. Likewise, the deformable jacket has at least one jacket alignment indicator mark on it.

Preferably, the threads on the threaded portion of the bolt have a variable pitch diameter.

In a typical three-plate injection molding machine, as the name implies, there are three plates involved in the molding operation. Typically these plates are referred to as the X plate, the B plate, and the A plate. A mold pattern is formed between a portion of the B plate and the A plate. A runner pattern is formed on the A plate which faces the X plate. The B plate is bolted to a support plate. The support plate is further secured to an ejector box or housing. The ejector box is clamped to a movable platen of the molding machine. The X plate is bolted to a top clamp plate, usually with two or more shoulder bolts. The top clamp plate is fixed to the opposing platen of the injection molding machine.

During the molding operation, the mold and runner patterns are filled with heated plastic injected from a reservoir connected to the top clamp plate. When the plastic has cooled, the moving platen pulls the ejector box and the associated support plate and B plate away from the A plate, thus initiating the sequential opening of the mold plates and the eventual removal of the molded parts and runner.

As the mold opens, the B plate and associated support plate are pulled away. At least one friction puller is secured to the B plate. The deformable jacket of the friction puller engages, via an interference fit, with a pocket in the A plate. The friction puller holds the A plate and the B plate together as the mold clamping force is removed. Springs between the A plate and the X plate to begin to expand and separate the A plate and X plate at a first parting line. The runner breaks free from the A plate and remains attached to the sucker pins. Sucker pins are pins secured to the top plate and pass through an opening in the X plate. The sucker pins serve to hold the runner in place while the A plate, B plate, and the support plate are moved away from the X plate. Further movement of the X plate away from the top clamp plate causes the runner to be stripped from the sucker pins.

When the shoulder bolts reach the end of their travel, the shoulder bolts hold the A plate in position and the B plate is moved further away. The A plate and the B plate separate at a second parting line.

Other features and advantages of the invention will be apparent from the following detailed description taken in conjunction with the following figures, wherein like reference numerals represent like features.

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Figure 1:
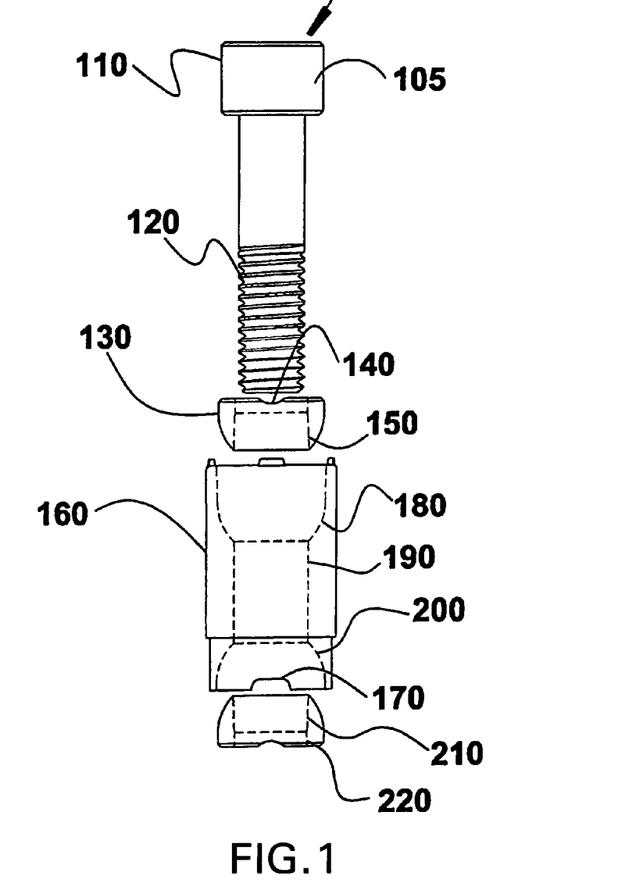
FIG. 1 shows an exploded sectional view of a friction puller according to the present invention.
Figure 2:
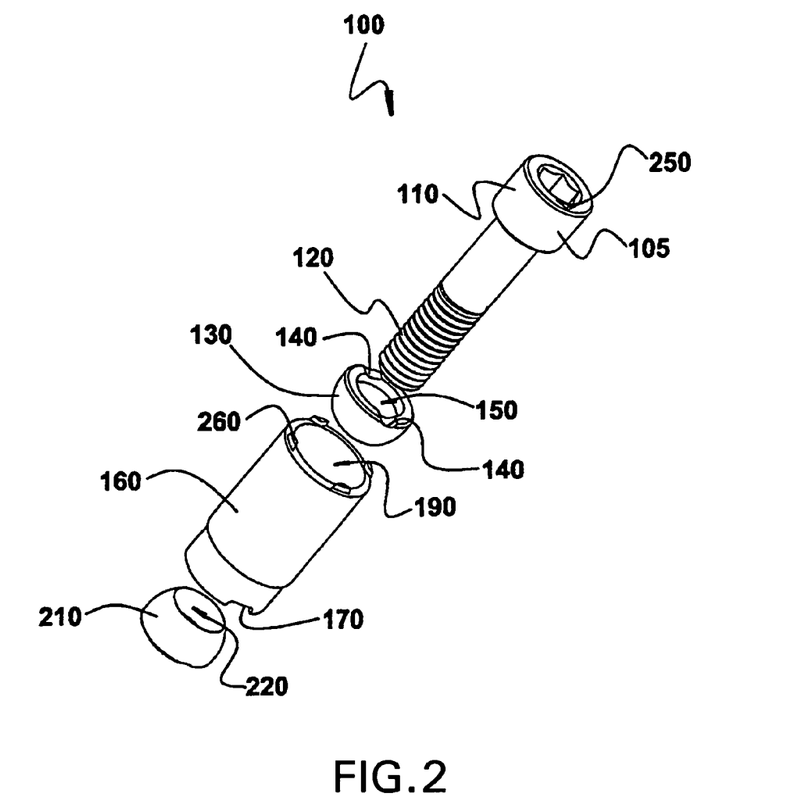
FIG. 2 shows an exploded perspective view of a friction puller according to the present invention.
Figure 3:
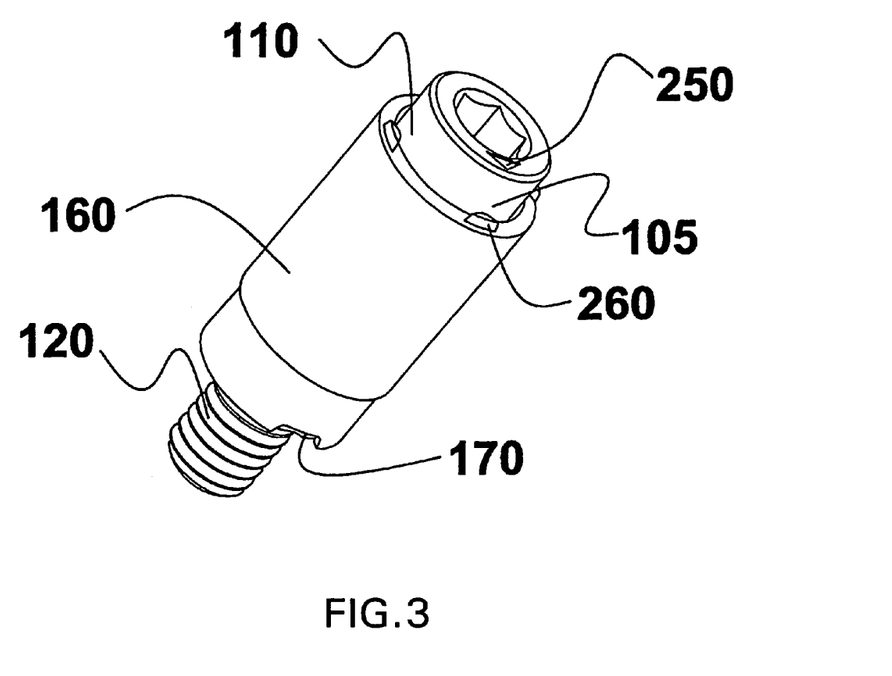
FIG. 3 shows an assembled perspective view of a friction puller according to the present invention.

The present invention is a friction puller 100 for an injection mold. FIG. 1 shows an exploded sectional view of a friction puller according to the present invention. FIG. 2 shows an exploded perspective view of a friction puller according to the present invention. FIG. 3 shows an assembled perspective view of a friction puller according to the present invention. The friction puller has a bolt 110, the bolt 110 has a head portion 105 and a threaded portion 120.

The friction puller also has a first substantially hemispherical wedge 130. The first substantially hemispherical wedge 130 has a first passage 150 running through it for the bolt 110. The first passage 150 allows the first substantially hemispherical wedge 130 a first predetermined amount of lateral float relative to the bolt 110. That is, the diameter of the first passage 150 is larger than the diameter of the threaded portion 120 of the bolt 110. In various preferred embodiments, the first substantially hemispherical wedge 130 has about 0.010 inches of lateral float. This allows the friction puller 100 to self-align, or self-center itself during use. Additionally, this allows for thermal expansion differences between the mold plates.

The friction puller also has a second substantially hemispherical wedge 210. The second substantially hemispherical wedge 210 has a second passage 220 running through it for the bolt 110. The second passage 220 allows the second substantially hemispherical wedge 220 a second predetermined amount of lateral float relative to the bolt 110. In various preferred embodiments, the second substantially hemispherical wedge 210 has about 0.010 inches of lateral float. This allows the friction puller 100 to self-align, or self-center itself during use. Additionally, this allows for thermal expansion differences between the mold plates.

The friction puller also has a deformable jacket 160. The jacket 160 has a third passage 190 running through it for the bolt 110. The jacket 160 has a first substantially hemispherical cup 180 for receiving the first substantially hemispherical wedge 150 and a second substantially hemispherical cup 200 for receiving the second substantially hemispherical wedge 210. The jacket 160 preferably includes a step in outer diameter, as can be seen in FIG. 1. The step in outer diameter further enables lateral float of the jacket 160.

Preferably, the first hemispherical wedge 150 has a least one vent relief notch 140 disposed in a top surface of the first hemispherical wedge 150. The vent relief notch 140 allows air pass through during mold operation. Likewise the deformable jacket 160 preferably has at least one jacket vent notch 170 disposed in a top surface of the deformable jacket 160. The jacket vent notch 170 also allows air to pass through during mold operation. By allowing air to pass through during mold operation, the adverse compressed air and vacuum conditions described above are avoided.

Figure 4:
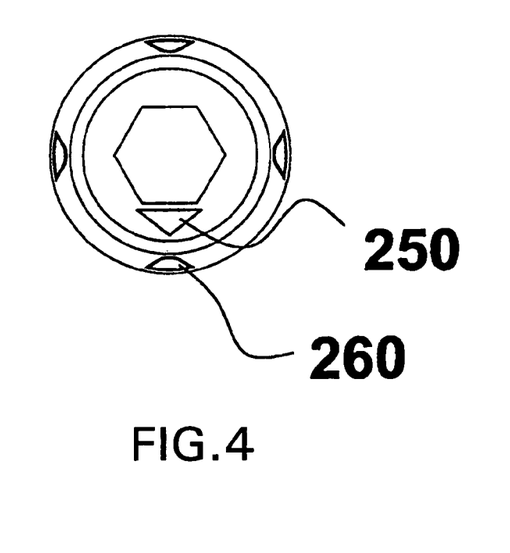
FIG. 4 shows a top view of a friction puller according to the present invention.

Preferably, the head portion 105 of the bolt 110 has at least one bolt alignment indicator mark 250 in it. Likewise, the deformable jacket 160 has at least one jacket alignment indicator mark 260 on it. These alignment indicator marks (250 and 260) allow the mold engineer and mold builder to see, and hopefully record, how many turns of the bolt 110 have been made during installation or maintenance of the mold. For example, each bolt 110 could be turned the same number of revolutions to achieve the same friction force. Additionally, any adjustments made to the bolt, e.g., a fraction of a turn, could also be seen and recorded. In various preferred embodiments, the bolt alignment indicator mark 250 is an arrow disposed on a top surface of the head portion 105 of the bolt 110 and the jacket alignment indicator mark 260 comprises an arrow disposed on a top surface of the deformable jacket 160. Any suitable number of alignment marks (250 and 260) can be used. In various preferred embodiments, there are four jacket alignment indicator mark comprises 260.

Figure 1A:
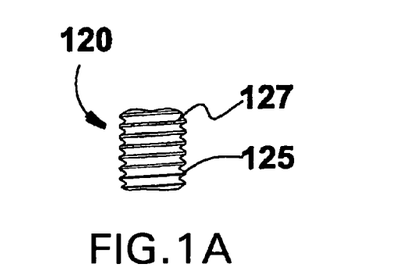
FIG. 1A shows a close up view of the bolt threads of a friction puller according to the present invention.

FIG. 1A shows a close up view of the bolt threads of a friction puller according to the present invention. Preferably, the threads on the threaded portion 120 of the bolt 110 have a variable pitch diameter. That is, the threaded portion 120 of the bolt 110 has a first pitch diameter at a first section 125 of the threaded portion 120 and a second pitch diameter at a second section 127 of the threaded portion 120.

This variable pitch diameter is different from other fasteners. Typically a fastener is engineered to stretch when the fastener head is limited from travel. The stretching is what creates the tightening torque. Although the bolt 110 of the present invention resembles a typical fastener installation, the bolt head 105 is never mating to a solid that limits its travel and produces the tightening torque. The variable pitch diameter resists unintentional backing out of the bolt 110 during operation. Furthermore, when the bolt 110 is unscrewed a specified amount for mold maintenance (or other reasons) the bolt 110 will hold its position without any force being exerted on it from the jacket 160.

Figure 5A:
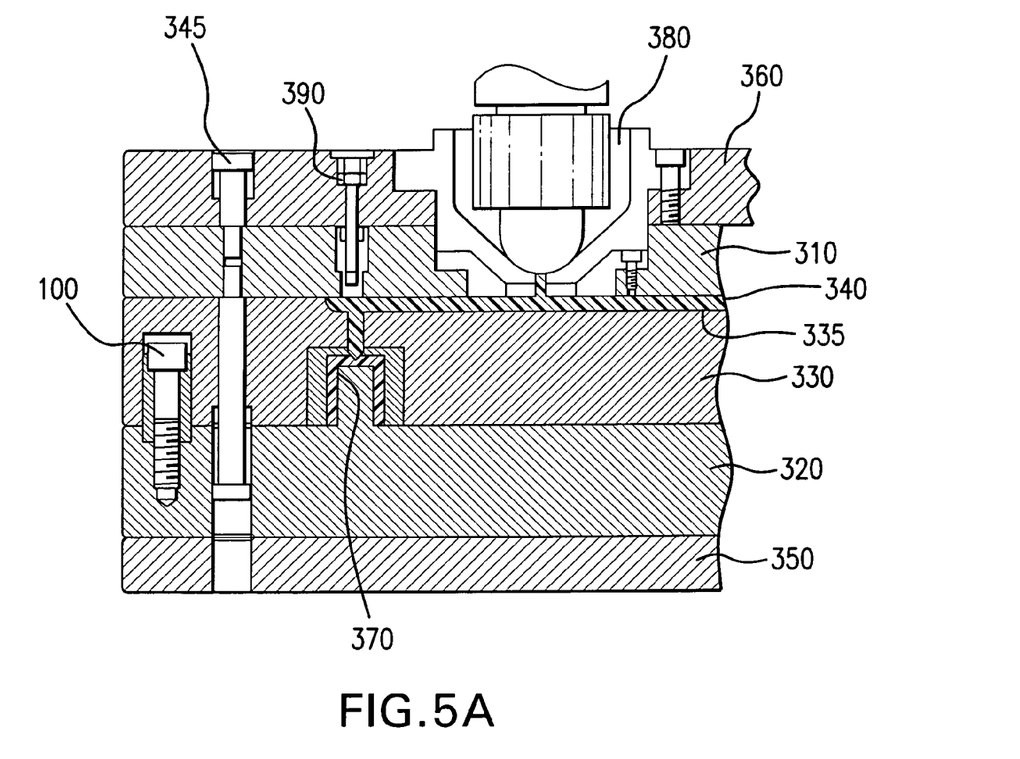
FIGS. 5A-5C show a three plate mold having a friction puller according to the present invention installed therein going through an opening sequence.
Figure 5B:
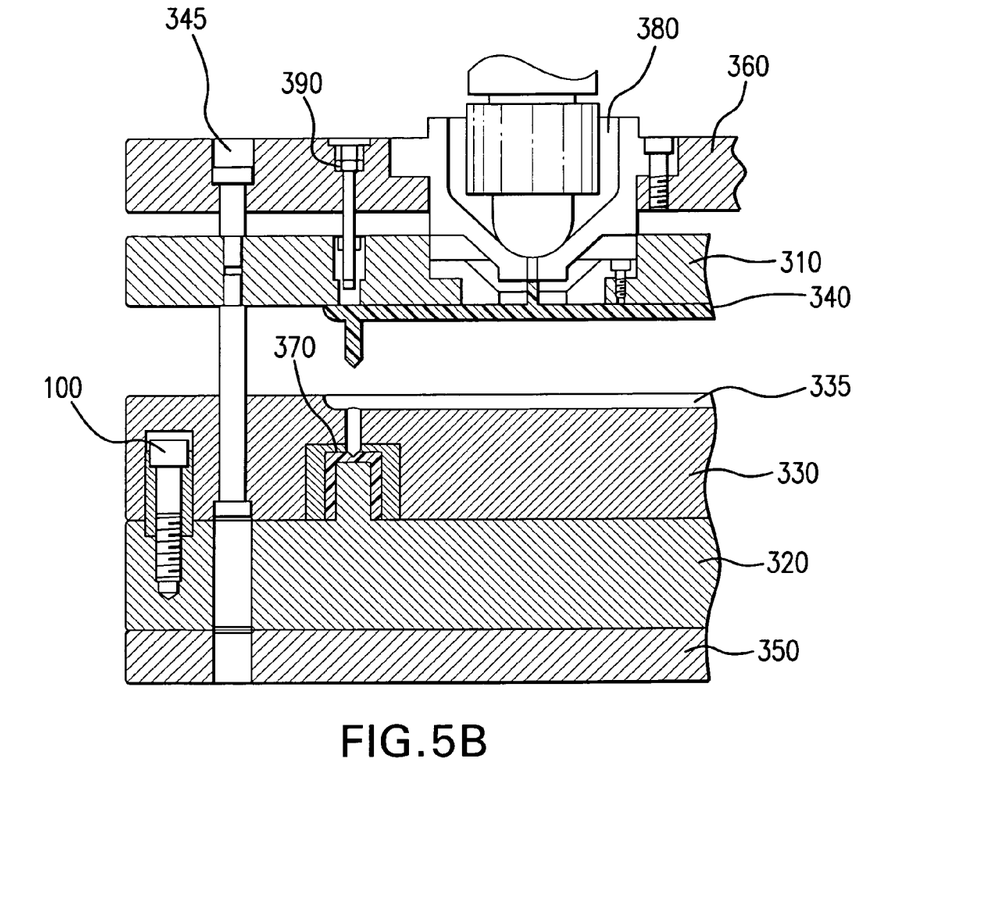
Figure 5C:
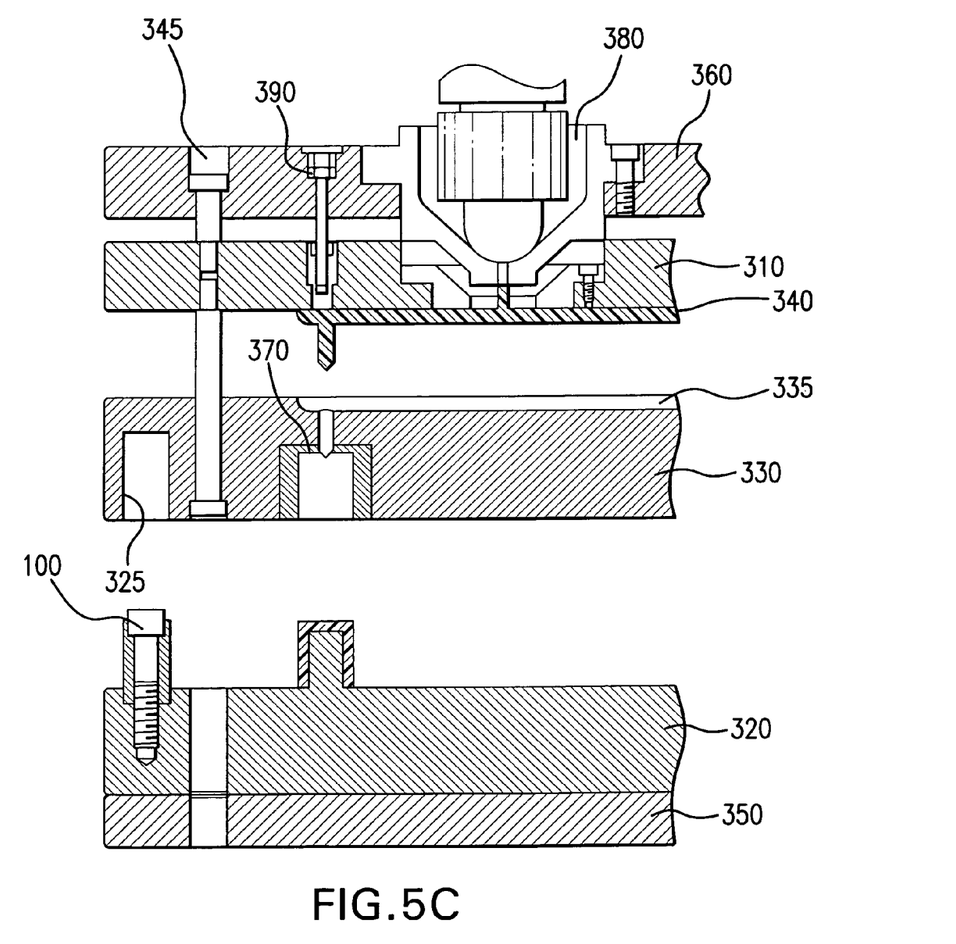

FIGS. 5A-5C show a three plate mold having a friction puller according to the present invention installed therein going through an opening sequence. In a typical three-plate injection molding machine, as the name implies, there are three plates involved in the molding operation. Typically these plates are referred to as the X plate 310, the B plate 320, and the A plate 330. A mold pattern 370 is formed between a portion of the B plate 320 and the A plate 330. A runner pattern 335 is formed on the A plate 330 which faces the X plate 310. The B plate 320 is bolted to a support plate 350. The support plate 350 is further secured to an ejector box or housing (not shown). The ejector box is clamped to a movable platen of the molding machine. The X plate 310 is bolted to a top clamp plate 360, usually with two or more shoulder bolts 345. The top clamp plate 360 is fixed to the opposing platen of the injection molding machine. FIG. 5A shows the mold in a closed position.

During the molding operation, the mold 370 and runner patterns 335 are filled with heated plastic injected from a reservoir 380 connected to the top clamp plate. When the plastic has cooled, the moving platen pulls the ejector box and the associated support plate 350 and B plate 320 away from the A plate 330, thus initiating the sequential opening of the mold plates and the eventual removal of the molded parts and runner 340.

As the mold opens, the B plate 320 and associated support plate 350 are pulled away, shown in FIG. 5B. At least one friction puller 100 is secured to the B plate 320. The deformable jacket 160 of the friction puller 100 engages, via an interference fit, a pocket 325 in the A plate 330. The friction puller 100 holds the A plate 330 and the B plate together as the mold clamping force is removed. Springs between the A plate 330 and the X plate 310 to begin to expand and separate the A plate 330 and X plate 310 at a first parting line. The runner 340 breaks free from the A plate 330 and remains attached to the sucker pins 390. Sucker pins 390 are pins secured to the top plate 360 and pass through an opening in the X plate 310. The sucker pins 390 serve to hold the runner 340 in place while the A plate 330, B plate 320, and the support plate 350 are moved away from the X plate 310. Further movement of the X plate 310 away from the top clamp plate 360 causes the runner 340 to be stripped from the sucker pins 390.

When the shoulder bolts 345 reach the end of their travel, shown in FIG. 5C, the shoulder bolts 345 hold the A plate 330 in position and the B plate 320 is moved further away. The A plate 330 and the B plate 320 separate at a second parting line.

While specific embodiments have been illustrated and described, numerous modifications come to mind without significantly departing from the spirit of the invention and the scope of protection is limited by the scope of the accompanying claims. These modification include, but are not limited to, replacing other types of friction pullers with friction pullers made according to the present invention and or retrofitting other types of friction pullers using the principles of the present invention.

What is claimed is:

1. A friction puller for an injection mold comprising:
   a bolt including a head portion and a threaded portion, the head portion of the bolt including a bolt alignment indicator mark disposed thereon;
   a wedge disposed around a portion of the bolt; and
   a deformable jacket including a cup for receiving the wedge and a passage therethrough for the bolt, the deformable jacket including at least one jacket alignment indicator mark disposed thereon.

2. The friction puller according to claim 1, further comprising a vent notch disposed in at least one of an end surface of the wedge or the deformable jacket, wherein the vent notch permits air to pass through.

3. The friction puller according to claim 1, wherein said bolt alignment indicator mark comprises an arrow disposed on a top surface of said head portion of said bolt.

4. The friction puller according to claim 1, wherein said jacket alignment indicator mark comprises an arrow disposed on a top surface of said deformable jacket.

5. The friction puller according to claim 4, wherein said at least one jacket alignment indicator mark comprises four alignment indicator marks.

6. The friction puller according to claim 1, wherein said threaded portion of said bolt comprises a first pitch diameter at a first section of said threaded portion and a second pitch diameter at a second section of said threaded portion, wherein the second pitch diameter is different from the first pitch diameter.

7. The friction puller according to claim 1, wherein the wedge comprises a substantially hemispherical wedge.

8. The friction puller according to claim 1, wherein the wedge comprises a second passage therethrough for the bolt, the second passage allowing the wedge a predetermined amount of lateral float relative to the bolt.

9. The friction puller according to claim 8, wherein said predetermined amount of lateral float relative to said bolt is about 0.010 inches.

10. The friction puller according to claim 1, further comprising a second wedge, the second wedge having substantially hemispherical shape and including a second passage therethrough for said bolt, the second passage allowing the second wedge a predetermined amount of lateral float relative to the bolt.

11. The friction puller according to claim 10, wherein the deformable jacket comprises a second cup for receiving the second wedge.

12. A friction puller for an injection mold comprising:
    a bolt including a head portion and a threaded portion;
    a wedge disposed around a portion of the bolt;
    a deformable jacket including a cup for receiving the wedge and a passage therethrough for the bolt; and
    a vent notch disposed in at least one of an end surface of the wedge or the deformable jacket, wherein the vent notch permits air to pass through.

13. The friction puller according to claim 12, wherein said threaded portion of said bolt has a first pitch diameter at a first section of said threaded portion and a second pitch diameter at a second section of said threaded portion, wherein the second pitch diameter is different from the first pitch diameter.

14. The friction puller according to claim 12, wherein the vent notch is disposed in the end surface of the deformable jacket.

15. The friction puller according to claim 12, wherein the end surface of the wedge comprises a top surface of the wedge.

16. The friction puller according to claim 12, wherein the wedge comprises a substantially hemispherical wedge.

17. The friction puller according to claim 12, wherein the wedge comprises a second passage therethrough for the bolt, the second passage allowing the wedge a predetermined amount of lateral float relative to the bolt.

18. The friction puller according to claim 17, wherein said first predetermined amount of lateral float relative to said bolt is about 0.010 inches.

19. The friction puller according to claim 12, further comprising a second wedge, the second wedge having substantially hemispherical shape and including a second passage therethrough for said bolt, the second passage allowing the second wedge a predetermined amount of lateral float relative to the bolt.

20. An injection mold comprising:
   a first plate;
   a friction puller mounted on the first plate, the friction puller comprising:
      a bolt including a head portion and a threaded portion, the head portion of the bolt including a bolt alignment indicator mark disposed thereon, and
      a wedge disposed around a portion of the bolt;
   a deformable jacket including a cup for receiving the wedge and a passage therethrough for the bolt, the deformable jacket including at least one jacket alignment indicator mark disposed thereon; and
   a second plate movable with respect to the first plate and including a pocket formed therein, wherein the deformable jacket and the pocket cooperatively engage via an interference fit between said deformable jacket and said pocket.

21. The injection mold according to claim 20, wherein
   said wedge further has at least one vent relief notch disposed in a top surface of said wedge,
   said deformable jacket has at least one jacket vent notch disposed in a top surface of said deformable jacket, and
   wherein said at least one vent relief notch and said at least one jacket vent notch permit air to pass through.

22. The injection mold according to claim 20, wherein
   said bolt alignment indicator mark comprises an arrow disposed on a top surface of said head portion of said bolt, and
   said jacket alignment indicator mark comprises an arrow disposed on a top surface of said deformable jacket.

* * * * *